May 2, 1961  A. A. MOLITOR  2,981,961
TAPPING SPINDLE FEED AND DRIVE MEANS
Filed Oct. 21, 1957  2 Sheets-Sheet 1
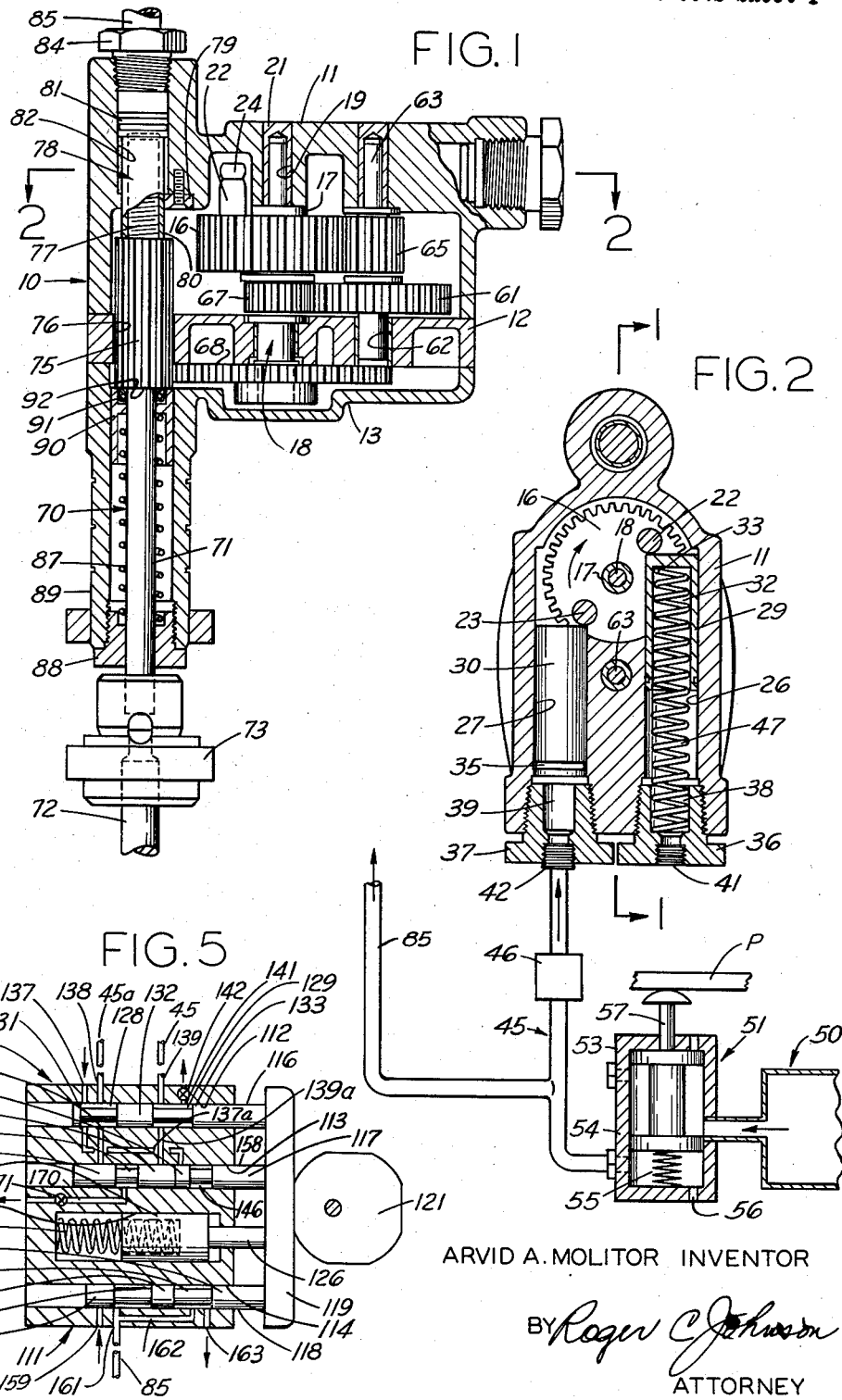
ARVID A. MOLITOR INVENTOR
BY Roger C. Johnson
ATTORNEY

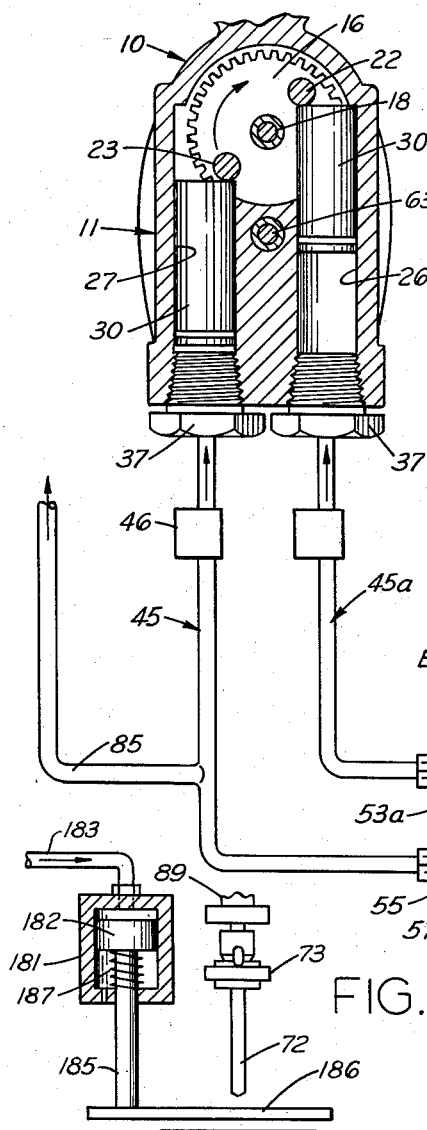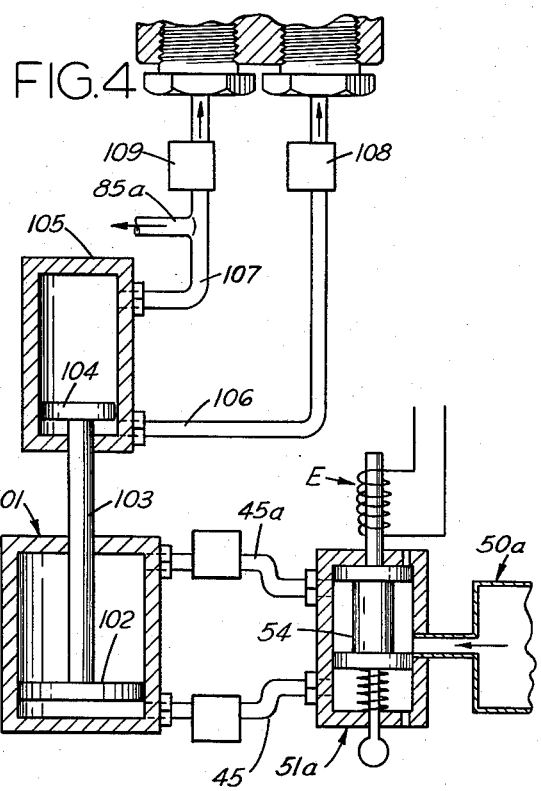

United States Patent Office 2,981,961
Patented May 2, 1961

2,981,961
TAPPING SPINDLE FEED AND DRIVE MEANS
Arvid A. Molitor, 1136 Morningside Drive, Elgin, Ill.

Filed Oct. 21, 1957, Ser. No. 691,297

10 Claims. (Cl. 10—138)

This invention relates generally to machine tools and more particularly to machines for automatically forming screw threads of predetermined length in apertures or recesses in work pieces, either internal threads, or external threads by the use of an acorn die or spindle, as when threading bosses.

The object and general nature of this invention is the provision of fluid pressure actuated means for driving the tap spindle in the advancing or tapping direction and means, biased when the tap spindle is advanced, for controlling or actuating the return of the tap spindle to its retracted position. More specifically, it is a feature of my invention to provide a fluid operated unit for advancing the spindle and spring means, placed under a bias by the action of the spindle advancing means, connected to drive the spindle to its retracted position.

Another feature of this invention is the provision of a tapping machine in which the tap spindle is advanced by one kind of means, such as, for example, a fluid pressure operated unit, and retracted by another kind of means, such as, for example, a resilient means, with provision for interchanging said two kinds of means so that either may be connected to either advance or retract the tap spindle.

An additional feature of the present invention is the provision in a tapping machine of fluid operated means for driving the spindle and fluid operated means acting simultaneously therewith for shifting the spindle to bring the tap into contact with the work, said two means being interconnected so that the tap is advanced against the work and then rotated to perform the desired tapping operation, practically instantly, it being understood that the work of shifting the spindle against the work piece is less than the work of rotating the tap to form the screw threads in the work piece.

It is a further feature of this invention to provide new and improved means for controlling the fluid pressure operated unit or units, as by speed control valve means or the like. Also, a plurality of taps may be driven at one time, if desired.

These and other objects and advantages of this invention will be apparent after a consideration of the following detailed description of the preferred structure incorporating the principles of my invention, taken in conjunction with the accompanying drawings, in which:

Fig. 1 is a vertical section, taken along the line 1—1 of Fig. 2, showing the casing or support, the drive gearing, the tap spindle and the spindle advancing and retracting means.

Fig. 2 is a section taken along the line 2—2 of Fig. 1, partly diagrammatic, showing the means for driving the spindle, first in one direction and then in the other.

Fig. 3 is a view similar to Fig. 2 showing two pressure units for driving the spindle, with modified control means.

Fig. 4 shows a further modified control means.

Fig. 5 shows a multi-spool valve arrangement providing for positive operation of the cylinders, whereby holding pressure is independent of the advancing pressure.

Fig. 6 shows an associated work clamping means.

Referring first to Fig. 1, the tapping machine of this invention includes a main support in the form of a casing 10 made up of three parts 11, 12 and 13. As best shown in Fig. 2, the upper casing part 11 forms a housing for an oscillatable gear member 16 journaled by means of a bearing bushing 17 on a rotatable shaft 18. The upper end of the shaft 18 is reduced and has bearing support in a boss formed on the casing part 11, the boss being apertured, as at 19, to receive a bearing sleeve 21. A pair of diametrically disposed studs 22 and 23 is fixed to the gear member 16. Each stud has a rounded piston-receiving end 24.

A pair of generally parallel cylinders 26 and 27 are formed in or carried by the casing part 11, as best shown in Fig. 2, and pistons 29 and 30 are disposed in the cylinders. The piston 29 in cylinder 26 is in the form of a plunger that is hollow, as indicated at 32, but has a closed end 33 engageable with the stud 22. The other piston 30 carries a sealing member in the form of an O-ring 35 at one end and at the other end the piston 30 bears against the other stud 23. Closures 36 and 37 are threaded into the outer ends of the cylinders, and the closures 36 and 37 have inner sockets or recesses 38 and 39 and threaded apertures 41 and 42.

Either one of the apertures 41 and 42 is adapted to receive an associated conduit or fluid line 45 and, as shown in Fig. 2, the line 45, which includes a speed control valve 46 of conventional construction, consisting principally of a controllable restriction, connects to the outer end of the cylinder 27 to deliver fluid, such as air, oil or other liquid, under pressure to and from the cylinder. A spring 47 seats in the recess 38 in the closure 36 and in the bore in the plunger or piston 29 and is biased so as to continually urge the piston 29 against the stud 22 and hold the latter and the gear member 16 in the positions shown in Figs. 1 and 2.

Fluid under pressure is supplied to the line 45 from a source 50 and is controlled by a valve unit 51 of the biased type. The valve unit 51 includes a valve body 53 in which a valve member 54 is held by a spring 55 in a position to prevent fluid flow from the source 50 through the valve unit 51 to the line 45. If the valve member 54 is pressed inwardly against the spring 55, as by movement imparted to a stem 57, either manually or by movement of some part P of a machine operation, fluid under pressure is then permitted to flow from the source 50 through the valve unit 51 and the line 45 to the cylinder 27, the pressure being sufficient to extend the piston 30, swing the gear member 16 through about 90° in the direction of the arrow in Fig. 2. This causes the stud to press the plunger 29 inwardly, placing the spring 47 under additional bias. Thus, as soon as the valve member is released, fluid pressure is cut off and the spring 47 substantially instantly drives the gear member 16 in the other direction.

Referring again to Fig. 1, the lower portion of the upper casing section 11 encloses a gear 61 that is fixed to a shaft 62 the upper portion 63 of which is journaled in a bearing sleeve 64. A pinion 65 is also fixed to the shaft 62 and meshes with the oscillatable drive gear 16. Below the latter is a second pinion 67 fixed to the shaft 18 and meshing with the gear 61 and driven by the latter. The lower ends of the shafts 18 and 62 are journaled in the intermediate housing section 12, the shaft 18 being extended into the lower housing section 13 and has fixed thereto a gear 68.

The support or casing 10 has provision for rotatably receiving a tap spindle 70, which includes an elongated member extending generally perpendicular to the planes of the various gears mentioned above. The tap spindle 70 includes a lower section 71 to which a suitable tap 72 is connected, as by the usual fitting 73. Integral with the upper part 71 of the tap spindle is a pinion section 75 that is elongated in an axial direction, the section 75 extending through an opening 76 in the intermediate casing section 12. The upper portion 77 of the integral tap spindle 70 is reduced in diameter and screw threaded, and received in a lead nut member 78, the interior portion of which is screw threaded to receive the threaded portion 77 of the tap spindle. The upper part of the lead nut member 78 is formed as a piston 81 and is equipped with a sealing O-ring, the piston 81 sliding within a cylinder 82 formed in a portion of the upper casing section 11. The outer part of the cylinder 82 is completed by a closure member 84, which may be identical with the closure members 36 and 37, described above, having means receiving a fluid line 85. The fluid line 85 is connected into the fluid line 45, as shown in Fig. 2.

The tapping apparatus as so far described operates as follows.

Figs. 1 and 2 show the parts in an idle or rest position. Operation is initiated by depressing the stem 57 of the valve unit 51. This causes fluid under pressure to be directed into the line 45 and to the cylinders 27 and 82, which are in parallelism. Since movement of the piston 30 requires compression of the spring 47, which may be under initial bias, fluid pressure directed to the cylinder 82 results in an immediate axial advance of the tap spindle so as to bring the tap 72 into contact with the associated work piece to be tapped. This axial advance of the spindle occurs a moment before the piston 30 starts to move the gear member 16. Continued pressure, after the spindle tap engages the work piece, actuates the gear 16 and thus causes the spindle and tap to be rapidly rotated at a rate controlled by the speed control valve 46. At the same time the spring 47 is compressed. The rotation of the tap forms threads in the work piece and the pressure in the cylinder 82 holds the tap against the work piece while the lead nut causes the tap to be further advanced proportionally to the rotation. The lead nut is held against rotation by a block 79 acting against a flat portion 80 on the member 78.

The axial advance of the tap and tap spindle, whether by rotation of the spindle relative to the lead nut or by pressure in the cylinder, takes place against a relatively light spring 87 that bears at its lower end against a closure member 88 threaded into the lower end of a sleeve 89 that is carried by or formed on the lower casing section 13. The upper end of the spring 87 bears against a slidable bushing 90 axially reciprocable in the sleeve section 89. The bushing 90 carries thrust bearing means 91 lying against a downwardly facing shoulder 92 on the spindle 70. When at the end of the tapping cycle the control valve 51 closes and the pressure is cut off, the line 45 is vented to atmosphere, as at 56, Fig. 2, the spring 47, placed under additional bias during the tapping cycle, acts immediately to drive the spindle in the retracting direction, and also the spring 87 retracts the spindle an amount in addition to that resulting from the backward rotation of the spindle portion 77 within the lead nut member 78.

From Fig. 2 it will be noted that the cylinders 26 and 27 are the same size. This makes it possible to interchange the pistons 29 and 30, and then connecting the conduit 45 and the associated closure member 37 in interchanged relation with the closure 36, fluid pressure may be used to retract the spindle while the spring 47 extends the spindle in the tapping direction. In this case the line 85 is closed off and the extending piston 81 is not used, relying entirely on the lead screw nut member to feed the tap into its work. When the pistons 29 and 30 are interchanged, as mentioned above, the spring 47 is changed with the piston 29.

A first modified form of this invention is illustrated in Fig. 3 in which the spring-actuated piston 29 is replaced by a fluid actuated piston 30, and two closures 37 employed. Fluid pressure lines 45 and 45a are connected to the closures 37 for actuating the two pistons 30. The valve unit for the two pressure lines 45 and 45a is indicated at 51a and is similar to the valve unit 51, embodying a casing 53a enclosing a valve member 54 to which two stems 57a and 57b are connected. A spring 55 encircles the lower stem 57b and the upper stem 57a serves as the movable plunger of an electric solenoid unit E. The casings 53 and 53a are vented at 56 and 56a. The lines 45 and 45a include speed control valves 46 and 46a and the two lines 45 and 45a lead to opposite end portions of the casing 53a. The spring 55 in the casing 53a biases the valve member to move to a position wherein pressure is normally maintained against the right hand piston 30 (Fig. 3) so as to hold the spindle in its upper position, but when the solenoid is actuated the valve member 54 is moved downwardly and fluid pressure is directed against the other piston 30 and the spindle is driven downwardly or in the tapping direction. When the solenoid E is deenergized the spring 55 reverses the valve member 54 and the parts return to the positions shown in Fig. 3.

The forms of the invention shown in Figs. 2 and 3 show a source of fluid pressure at 50 that may be either air pressure or hydraulic pressure, as desired. In some cases, as when finer speed control may be sought, a combination of air pressure and hydraulic pressure may be utilized. This is illustrated in Fig. 4 in which the fluid pressure source 50a represents air pressure, and in this form of my invention the same valve control means shown in Fig. 3 are used, and hence the same reference numerals are used in Fig. 4 as in Fig. 3, so far as the controlling valve means is concerned. In Fig. 4, however, the fluid lines 45 and 45a are connected to an air cylinder 101 having closed ends and a piston 102 therein. The piston 102 is connected by a piston rod 103 to a piston 104 in an oil cylinder 105 to the ends of which oil lines 106 and 107 are connected. Hydraulic speed control valves 108 and 109 are connected in the lines 106 and 107, respectively.

In Fig. 4 valve unit 51a controls the piston 102 in the air cylinder 101 and the interconnected piston 104 serves to direct oil into one or the other of the cylinders 26 or 27 to drive or retract the spindle. In Fig. 4 the connection 85 for actuating the lead piston 81 may be made with the air line 45, or with the oil line 107, as indicated at 85a.

In certain cases, as where the tap is required to work exceptionally hard or tough material, such as stainless steel, for example, it may be necessary to use considerable force on the piston 81 (Fig. 1) to hold the lead screw nut 78 in position. In situations of this kind it would be desirable to apply a force on the piston 81 independently of the force required to drive the gear 16 and rotate the tap spindle. Fig. 5 shows a valve arrangement adapted to be incorporated in the controls for the arrangement illustrated in Figs. 1 and 3 where two pistons actuate the drive gear and a third piston actuates the lead screw nut member.

Referring now to Fig. 5, which is largely diagrammatic in character, the positive control unit 110 includes a valve body 111 having three valve bores 112, 113, and 114 therein, having valve members 116, 117 and 118 slidable in the valve bores, respectively. A plate 119 is connected to the several valve members so as to operate them simultaneously. One operating means therefor may be in the nature of a rotatable cam 121 actuated by any suitable means, mechanical, manual, or otherwise. A cylinder 122 is formed in the valve body 111 and receives a piston 123 against which a spring 124 bears. The piston 123 is connected with the plate 119 by a stem 126.

The valve member 116 is formed with a pair of annular chambers 128 and 129 separated by lands 131, 132 and 133 that fit snugly and in leaktight relation in the valve bore 112. The lands are provided with sealing O rings. A pressure inlet 137 and an outlet connection 138 communicate with the chamber 128, when the valve part 116 is in the position shown in Fig. 5, in which position of the valve the pressure inlet 137 communicates with the cylinder connection 138 which is in direct communication with the line 45a leading to the reverse cylinder or retracting cylinder 26 (Fig. 3), pressure in which holds the tapping spindle in its retracted position, as described above.

The valve body 111 also includes another cylinder connection 139 which extends through the valve body 111 into communication with the valve chamber 129, and also communicating with the chamber 129, in this position of the valve 116, is an exhaust outlet or vent 141 controlled by a speed control adjustable restriction 142. The cylinder connection 139 communicates directly with the line 45 that leads to the power or advancing cylinder 27. In this position of the valve 116, the cylinder 27 is vented to atmosphere, through vent 141, while the chamber 128 leads pressure from the line 137 into the line 45a, thus holding the tapping spindle in its retracted position, which is the same position as shown in Fig. 3.

The valve member 117 is similar to the valve member 116 and is provided with a pair of annular chambers 145 and 146 and associated lands 147, 148 and 149. The valve body 111 carries an extension 137a of the pressure line 137, the inner end of the passageway 137a terminating at the land 149 in the position of the valve shown in Fig. 5. A conduit or passageway 139a, serving as an extension of the connection 139 that leads to the cylinder lead 45, extends from the bore 112 to the bore 113 but is blocked off by the land 148 in the position of the valve as shown in Fig. 5.

The third valve member 118 is also similar to the valve member 116 and includes two chambers 153 and 154 and spaced land sections 155, 156 and 157. A pressure connection 159 is in direct communication with the other pressure inlet or connection 137, both being arranged to receive fluid under pressure from any suitable source, such as that indicated at 50. Adjacent the pressure inlet 159, the valve body 111 is provided with a connection 161 that communicates directly with the fluid line 85, but in this form of the invention the line 85 is not connected into the line 45 as it is in the form shown in Fig. 2. In the position of the valve shown in Fig. 5, the connection is blocked off by the land 155. An extension 162 leads from the connection 161 and in the position of the valve shown in Fig. 5, both the extension 162 and the connection 161 serve to interconnect the valve chambers 153 and 154. A vent 163 is formed in the body 111 adjacent the end of the extension 162 and also communicates with the chamber 154, whereby in the position of the valve shown in Fig. 5, the cylinder 82 is vented to atmosphere through conduits or passageways 85, 161, 162, 154 and 163.

The operation of the control mechanism just described is substantially as follows.

Fig. 5 shows the valve in its normal position in which pressure transmitted through connection 137, chamber 128 and line 45a holds piston 30 in the position shown in Fig. 3 in which spindle gearing is in its reverse position and the spring 87 holds the spindle in its upper or retracted position. The cylinder 27 and the cylinder 82 are vented to atmosphere, the cylinder 27 being vented through line 45, connection 139, chamber 129 and vent 141 (Fig. 5) and the cylinder 82 being vented through line 85, connection 161 and extension 162, chamber 154 and vent 163.

After a work piece to be tapped is in position the machine is set into operation by actuating the cam 121 through about 90°, which will shift the plate 119 about half way toward the valve body 111. This will shift the valve plungers 116, 117 and 118 with the following results: (1) The land 147 of plunger 117 will be moved to the left (Fig. 5) and bring the chamber 146 into communication with the extension 137a of the pressure passageway 137, and the chamber 145 is brought into communication with the extension 138a of the cylinder line 138. However, the valve movement is not sufficient to bring the chamber 146 into communication with the cylinder line 139a or the chamber 145 into communication with a vent line 170 with which is associated a speed control flow restriction 171, such as a needle valve or the like. (2) The aforesaid movement of the valve plate brings the chamber 153 of the valve plunger 118 into communication with the pressure connection 159 and the land 157 closes off the vent 163. Thus, pressure is now directed into the rapid advance cylinder line 85 through connection 161 and the piston 78 is immediately forced downwardly (Fig. 1), compressing spring 87.

Thus, the tapping spindle is advanced into contact with the work by pressure means that acts entirely independently of the pressure that subsequently rotates the spindle.

The valve plate 119 is next moved to a tapping position by a further movement of the cam 121 through another 90°. This shifts the plate 119 almost to the valve body 111, with the following results: (1) The cylinder 26 is vented to atmosphere through chamber 145 being brought into communication with the extension 138a, vent line 170 and controlling valve 171. (2) The cylinder 27 is placed in communication with the pressure line 137 through extension passageway 137a, chamber 146, extension line 139a and connection 139. (3) Pressure is held in the rapid advance cylinder 82 through pressure connection 159, chamber 153 and connection 161. After the tapping operation has been completed the cam 121 is turned back to its original or normal position (Fig. 5) and the spring 124 returns the valve plungers 116, 117 and 118 to the position shown in Fig. 5.

Instead of cam 121 and spring 124, the valve plate 119 may be operated by controlled hydraulic lines brought into connection with the ends of the cylinder 122 at opposite sides of the plunger or piston 123 therein. Electrical means also may be used.

In some cases it may be desirable to clamp the work piece to be tapped and to operate such clamping means automatically and at the same time that the rapid advance plunger 78 is actuated to move the tap spindle down against the work piece. For this purpose I provide the following mechanism.

A cylinder 181 is provided at its closed end with a connection 183 that extends to the pressure line 85. A piston 182 in the cylinder 181 has a stem 185 that extends downwardly to a point of connection with a work clamping plate 186. A spring 187 urges the piston 182 and plate 186 upwardly. The plate 186 when forced downwardly, as by oil or air pressure in the cylinder 181, serves to clamp a work piece W to a table or support T in a position to be tapped when the tap 72 is lowered, as described above.

In operation, whenever the valve unit of Fig. 5 is shifted into its second position, pressure from the pressure line 159 passes through chamber 153 into line 85, and from the latter the pressure is led into cylinder 82, advancing the tap, and at the same time the pressure is led into the cylinder 181 from the connection 183. Thus, the work piece is clamped and the tap held against the work piece before the tap is rotated.

While I have shown and described above the preferred structure in which the principles of my invention have been incorporated, it is to be understood that my invention is not to be limited to the particular details shown and described above, but that in fact widely different means may be employed in the practice of the broader aspects of my invention.

What I claim, therefore, and desire to secure by Letters Patent is:

1. A tapping machine comprising a casing including a pair of cylinders, a pair of pistons therein, a tap spindle rotatable in said casing in either an advancing or a retracting direction, drive transmitting means in said casing and connecting said spindle with said pistons, whereby movement of one piston in one direction will drive said spindle in one direction and movement of the other piston will drive the spindle in its other direction, means interconnecting said pistons so that when one is moved in one direction the other piston is moved in another direction, substantially identical closure means disposed at the outer ends of said cylinders, each closure means including an aperture and an inner socket, fluid operated means connected with one cylinder through the aperture in the associated closure means to actuate the piston in said one cylinder, resilient means disposed in the other cylinder and seating in the socket of the closure means associated with the other cylinder, said resilient means being connected to act against the other piston, said resilient means and said fluid means being interchangeably connectible with one or the other of said closure means, whereby either may be connected to actuate the spindle in the advancing or retracting direction.

2. A tapping machine comprising a support, a pair of cylinders therein, a piston in one cylinder, a plunger in the other cylinder, a tap spindle axially shiftable relative to and rotatable in said support, gearing connecting said piston and plunger with said spindle and including an oscillatable gear sector connected with said piston and plunger so that when the piston is driven in one direction said spindle is rotated and the plunger is shifted in one direction, releasable fluid pressure means operably connected with said one cylinder to actuate the piston therein and drive said spindle in one direction, means connected with the plunger to shift the latter when the fluid pressure is released so as to drive the spindle in its opposite direction, a second piston and cylinder means connected with said spindle to shift the same axially, and means connecting said second piston and cylinder means with said releasable fluid pressure means, whereby when the latter acts to rotate said spindle said second piston and cylinder means are actuated so as to advance said spindle axially.

3. A tapping machine as defined in claim 2, further characterized by said plunger shifting means comprising a spring biased when said spindle is driven by actuation of said piston.

4. In a tapping machine, a support, a spindle mounted for both rotation and axial movement in said support, gearing means connected with said spindle to rotate said spindle said gearing including a gear fixed to said spindle, a sector rotatable about an axis parallel to the axis of the spindle and meshing with said spindle gear, a source of fluid pressure, a first fluid pressure operated unit connected to actuate said sector and rotate said spindle, means including a second fluid pressure operated unit connected in parallelism with said first unit for shifting said spindle axially, said second pressure operated means comprising a piston connected with one end of said spindle, and a cylinder receiving said piston and fixed to said support, and a common connection extending from said source of fluid pressure to both of said fluid operated units.

5. In a tapping machine, a support comprising a casing formed with a pair of cylinders, an elongated sleeve member extending from one portion of the casing and lying generally perpendicular to the plane containing said cylinders, a piston-like member mounted in each cylinder, a spindle mounted for both rotation and axial movement in said elongated sleeve member, one end of said spindle extending outwardly of said sleeve member, the sleeve member having a cylinder receiving the other end of said spindle, a piston connected with said other end of said spindle, drive means connected to rotate said spindle and including an oscillatable gear sector disposed in said casing, a pinion on said spindle geared to said sector, and stud means on said sector and receiving the adjacent ends of said piston-like members, releasable fluid pressure means connected to apply pressure simultaneously to one of said cylinders of said pair and the cylinder in said sleeve member for advancing said spindle axially while rotating the spindle, and spring means connected with the piston-like member in the other of said pair of cylinders so as to be biased when said fluid pressure swings said sector to advance said spindle, said spring means acting, when said fluid pressure is released, to swing the sector in the other direction and retract said spindle.

6. A tapping machine comprising a support, a tap spindle mounted in said support for both axial movement and rotation, an axially shiftable but non-rotatable lead member connected with said spindle to advance the latter axially in response to rotation of the spindle, a first fluid operated means connected with said lead member to advance the latter axially so as to advance said spindle, and a second fluid operated means connected in parallel with said first fluid means and acting to rotate said spindle relative to said lead member.

7. A tapping machine comprising a source of fluid pressure, means serving as a pair of closed chambers enclosing a movable wall means, a rotatable tap spindle, means including gearing having a sector gear connecting said tap spindle with said movable wall means, whereby movement of the latter drives said tap spindle in one direction or the other, depending upon which of said chambers receives fluid under pressure from said source, valve means movable between two positions and connected between said source and said pair of closed chambers and operative to pressurize one or the other of said chambers, depending on the position of said valve means, resilient means acting against said valve means to yieldably hold said valve means in one of its positions, and means connected to overcome said resilient means and shift said valve means to its other position, said tap spindle being shiftable axially, fluid pressure means to shift said spindle axially, and means connected to pressurize said spindle shifting means simultaneously with the pressurization of said closed chamber.

8. A tapping machine comprising a casing, a gear sector mounted for oscillation in said casing, a pair of cylinders disposed in said casing, a piston member in each cylinder and connected to oscillate said sector, an elongated sleeve member carried by the casing, a tap spindle rotatable in said sleeve member and carrying a pinion fixed to the inner end portion of the spindle within the casing, a cylinder in the casing disposed adjacent the inner end of the spindle and in longitudinal alignment with the spindle, a piston within said latter spindle, means holding the piston against rotation in the cylinder, and means interconnecting the piston with the spindle to accommodate rotation of the latter relative to the piston, drive means connecting the spindle pinion with said sector, means directing fluid under pressure into said latter cylinder to advance said spindle, and means acting against the piston members to actuate said sector and rotate the spindle.

9. In a tapping machine, a main support comprising a plurality of casing parts, one casing part enclosing an oscillatable member and having a pair of cylinders, pistons disposed in said cylinders, means on said oscillatable member receiving the adjacent ends of said pistons in said cylinders serves to swing said oscillatable member in one direction or the other, said main support including a second casing part, gearing carried at least partially by said second casing part and including a spindle-driving gear, said main support also including a tubular extension, a spindle rotatably disposed in and shiftable axially in said tubular extension, a pinion connected to one end portion of said spindle and shiftable axially in said tubular extension with said spindle, spring means confined between said pinion and said tubular extension for yieldably opposing axial movement of said spindle, a cylinder receiving the pinion end of said spindle, a piston disposed in said cylinder and rotatably receiving said pinion end of the spindle, and means directing fluid pressure into said cylinder for advancing said spindle and simultaneously directing fluid pressure into one of said pair of cylinders for driving said spindle through said oscillatable member, said gearing and said spindle-driving gear.

10. The invention set forth in claim 9, further characterized by a slidable bushing carried within said tubular extension, one end of said spring bearing against said bushing, and thrust bearing means disposed between said pinion and said slidable bushing.

References Cited in the file of this patent

UNITED STATES PATENTS

| | | |
|---|---|---|
| 1,434,564 | Ruetschi | Nov. 7, 1922 |
| 2,068,084 | Stahlhammer | Jan. 19, 1937 |
| 2,206,031 | Drissner | July 2, 1940 |
| 2,310,124 | Shartle | Feb. 2, 1943 |
| 2,500,540 | Graves | Mar. 14, 1950 |
| 2,799,871 | Torosian | July 23, 1957 |
| 2,850,926 | Jobe | Sept. 9, 1958 |
| 2,887,907 | Lauck | May 26, 1959 |

FOREIGN PATENTS

| | | |
|---|---|---|
| 616,401 | Great Britain | Jan. 20, 1949 |